United States Patent [19]
Bar-Nahum

[11] Patent Number: 5,739,819
[45] Date of Patent: Apr. 14, 1998

[54] METHOD AND APPARATUS FOR GENERATING AN ARTIFICIAL SHADOW IN A TWO DIMENSIONAL COLOR IMAGE

[75] Inventor: Guy Bar-Nahum, Bat Yam, Israel

[73] Assignee: Scitex Corporation Ltd., Herzelia, Israel

[21] Appl. No.: 596,761

[22] Filed: Feb. 5, 1996

[51] Int. Cl.$^6$ .................................................. G06T 15/60
[52] U.S. Cl. ........................... 345/426; 345/435; 382/274
[58] Field of Search .................................. 395/121, 126, 395/135; 345/113, 139; 382/274, 284

[56] References Cited

U.S. PATENT DOCUMENTS

| | | | |
|---|---|---|---|
| 4,645,459 | 2/1987 | Graf et al. | 395/126 X |
| 4,862,391 | 8/1989 | Ohhashi | 395/126 |
| 4,866,637 | 9/1989 | Gonzalez-Lopez et al. | 395/126 |
| 5,043,922 | 8/1991 | Matsumoto | 395/126 |
| 5,055,918 | 10/1991 | Berman | 382/274 X |
| 5,083,287 | 1/1992 | Obata et al. | 395/126 |
| 5,222,203 | 6/1993 | Obata | 395/126 |
| 5,282,262 | 1/1994 | Kurashige | 395/126 |
| 5,295,234 | 3/1994 | Ishida et al. | 395/121 |
| 5,299,298 | 3/1994 | Elmquist et al. | 395/126 |
| 5,377,313 | 12/1994 | Scheibl | 395/126 |
| 5,422,986 | 6/1995 | Neely | 395/126 |
| 5,568,595 | 10/1996 | Yosefi et al. | 395/126 |

OTHER PUBLICATIONS

Hsu P. et al. "Superposing Images with Shadow Casting". Proceedings of the First IEEE Conference on Visualization. Visualization '90. San Francisco, CA, 23–26 Oct. 1990, ISBN 0–8186–2083–8, Los Alamitos, CA, IEEE Comp. Soc. Press, pp. 298–306.

Jansen F.W. et al. "A Shadow Algorithm for CSG", Computers & Graphics, 1991, UK, vol. 15, No. 2, ISSN 0097–8493, pp. 237–247.

Roy G.G., et al "SR: A PC-based CAD System for Shadow and Reflection Studies in the Built Environment", Computer Aided Design, Oct. 1989, UK, vol. 21, No. 8, ISSN 0010–4485, pp. 497–504.

"Method to Permit Selective Shading of Graphic Object", Research Disclosure, No. 25701, Sep. 1985, UK, p. 423.

Primary Examiner—Mark K. Zimmerman
Attorney, Agent, or Firm—Wilson Sonsini Goodrich & Rosati

[57] ABSTRACT

A method and apparatus for carrying out the method for generating an artificial shadow in a two dimensional color image. The method includes the steps of providing a shadow scenes library, each shadow scene representing at least one artificial shadow orientation with respect to an object forming the shadow, receiving a user input, the user selecting one of the shadow scenes and an object in the two dimensional image to be shadowed, and forming an artificial shadow to the object to be shadowed in accordance with the selected shadow scene.

16 Claims, 5 Drawing Sheets

METHOD AND APPARATUS FOR GENERATING AN ARTIFICIAL SHADOW IN A TWO DIMENSIONAL COLOR IMAGE

FIELD OF THE INVENTION

The present invention relates to two dimensional color image editing generally and more particularly to a system and method for generating shadows in two dimensional color images.

BACKGROUND OF THE INVENTION

Methods for generating artificial shadows in two dimensional (2D) images are known in the art, one example described in coassigned published European Patent Application No. 622,748 A2.

Generally speaking, the generation of an artificial shadow in a 2D color image involves two main steps, namely, defining an area on the 2D image to be shadowed and applying a suitable color to the selected area.

Conventional methods for generating artificial shadows in 2D color images include full manual methods and semi-manual methods.

In the manual method, a user which edits a 2D color image employs an interactive tool, such as an air brush with which it interacts with the 2D image displayed on the color editing workstation. Typically, the user will mark by hand an area to be shadowed, then will mask it with a masking file and will replace the original color with a color generated from a separate color editing function, such as a degrade function or a vignette function. This method is time consuming since it involves both manual selection of the shadowed area and work on separate files, i.e., the mask file, and the coloring file (degrade or vignette).

In the semi-manual method, a user defines an area to be shadowed as described for the full manual method. Then an automatic shadowing function colors the selected area to be shadowed. This method described in the above coassigned patent application is advantageous with respect to the full manual method, however, the user is still forced to mark the area to be shadowed, a time consuming task which demands a high level of expertise from the user.

Both methods are available as commercial applications operating with a color editing workstation, such as the PRISMA workstation, commercially available from Scitex Corporation Ltd of Herzlia, Israel.

SUMMARY OF THE INVENTION

The present invention seeks to provide an improved system and method for generating artificial shadows in 2D color images which overcome the drawbacks associated with the full manual and semi-manual methods of the prior art.

Another object of the present invention is to provide a semi-automatic method for generating artificial shadows in 2D color images which requires relatively small user intervention.

Yet another object of the present invention is to provide a method for generating artificial shadows in 2D color images which enables to remake the shadows created for one object in the image to other different objects, while preserving the basic shadow qualities for all objects, in a way that assures optical consistency of the shadows for all the objects in a page.

Yet another object of the present invention is to provide a system and method for generating improved artificial shadows in 2D color images, the shadows having improved colors with respect to prior art methods.

There is thus provided, according to a preferred embodiment of the present invention, a method for generating an artificial shadow in a two dimensional color image which includes the following steps:

A. providing a shadow scenes library, each shadow scene representing at least one artificial shadow orientation with respect to an object forming the shadow. Preferably, but not necessarily, the shadow scene library is represented by a graphic representation displayable to the user;

B. receiving a user input, the user selecting one of the shadow scenes and an object in the two dimensional image to be shadowed; and C. forming an artificial shadow to the object to be shadowed in accordance with the selected shadow scene.

Further, the method may also include the step of selecting at least one additional object in the two dimensional color image and forming a shadow to each of the selected objects in accordance with the selected shadow scene.

Still further, the method may also include the step of defining a geometrical feature defining the object. According to a preferred embodiment of the present invention, the geometrical feature is rectangular.

According to a preferred embodiment of the present invention, the step of forming includes the steps of calculating the artificial shadow from the object and the object scene and moving the calculated artificial shadow to a selected location with respect to the object. Additionally, the step of forming may include the step of applying at least one color to the artificial shadow.

According to yet another preferred embodiment of the present invention, the step of forming includes the steps of calculating the artificial shadow from the geometrical feature defining the object and the selected object scene and applying at least one color to the artificial shadow.

Further, the step of calculating preferably includes the steps of:

A. converting the geometrical feature defining the object from a two dimensional representation to a three dimensional representation;

B. providing parameters defining the selected shadow scene;

C. determining a three dimensional representation of the artificial shadow defined by a corresponding geometrical feature based on the parameters and the three dimensional representation of the object obtained by the converting; and D. converting the three dimensional representation of the geometrical feature defining the artificial shadow to a two dimensional representation thereof, thereby providing the artificial shadow.

According to a preferred embodiment of the present invention, the parameters include an indication of the artificial shadow angle with respect to the horizon, the height of the object above a reference level, such as the ground level, a location of the light source and any combination therebetween.

There is also provided, according to the present invention, apparatus for carrying out the steps of the methods of the present invention.

BRIEF DESCRIPTION OF THE DRAWINGS

The present invention will be understood and appreciated more fully from the following detailed description taken in conjunction with the appended drawings in which.

DESCRIPTION OF THE PREFERRED EMBODIMENTS

Figure 1:
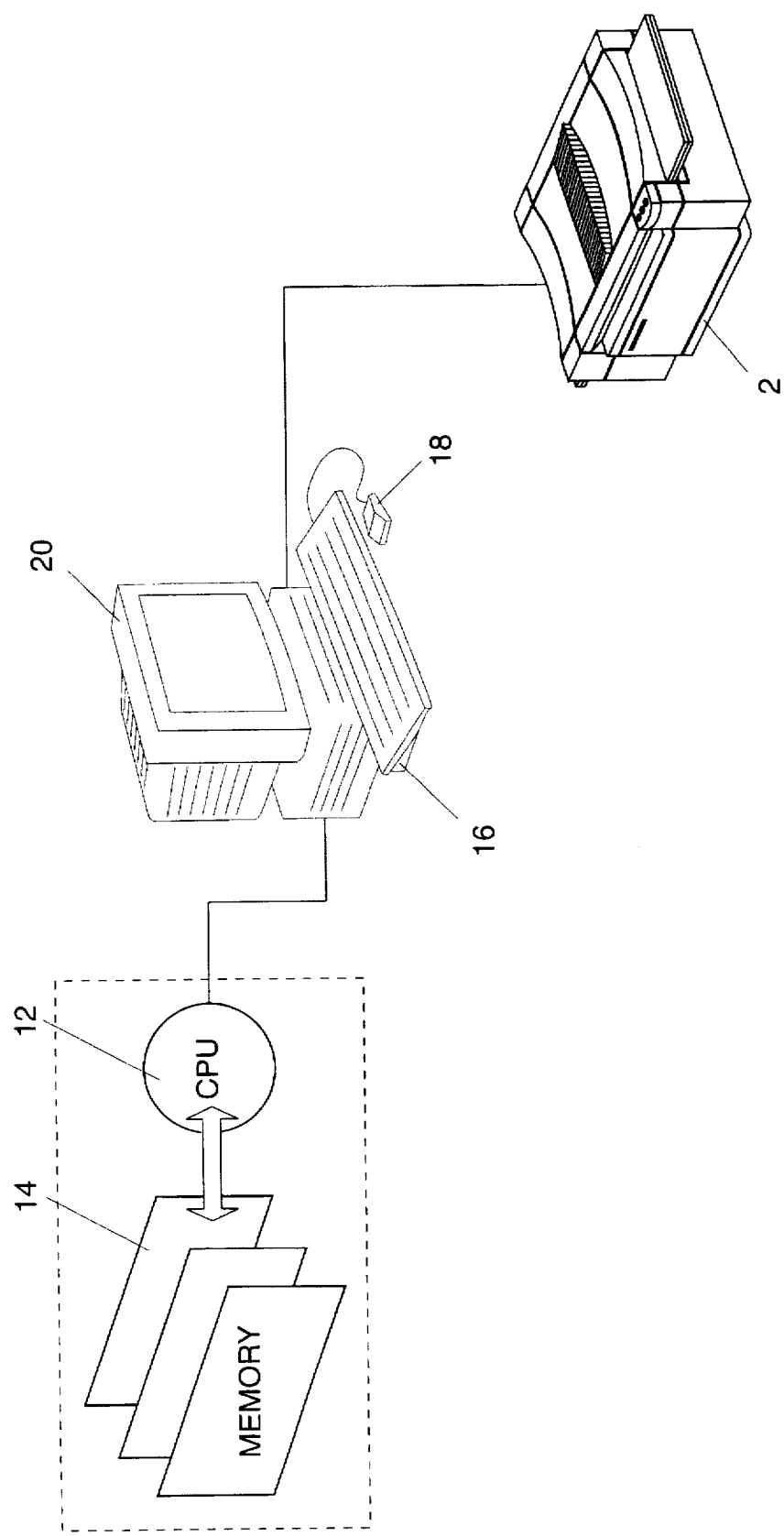
FIG. 1 is a schematic illustration of a color image workstation suitable for executing the method for generating artificial shadows in a 2D color image of the present invention.
Figure 2:
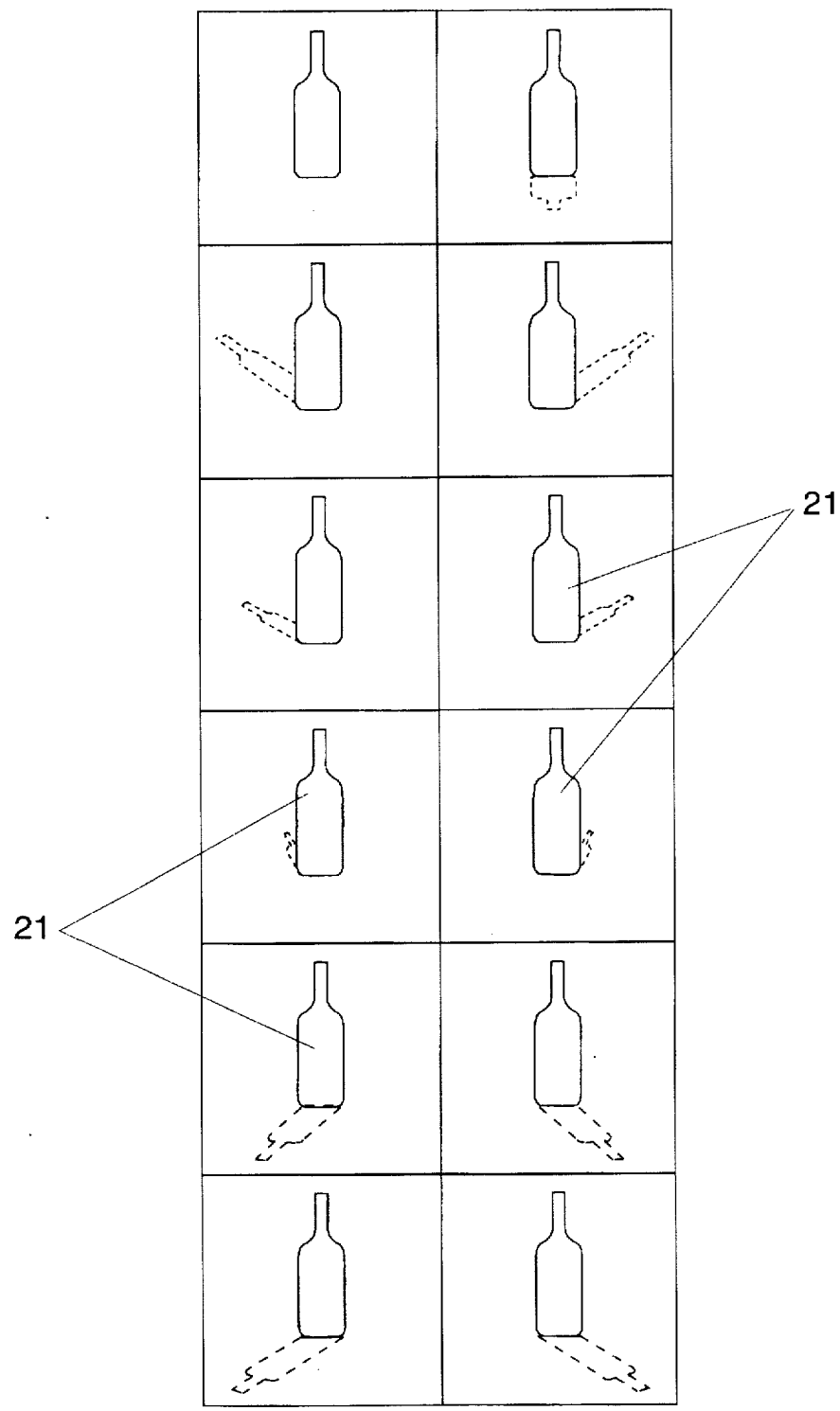
FIG. 2 is a schematic pictorial illustration of a plurality of icons representing the shadow scenes of the present invention.

Reference is now made to FIGS. 1 and 2 which illustrate a workstation executing an application constructed and operative according to a preferred embodiment of the present invention, respectively.

The computer workstation of FIG. 1, generally referenced 10, may be any interactive workstation, such as the Prisma workstation, commercially available from Scitex Corporation Ltd. of Herzlia, Israel, which comprises a CPU 12, a memory 14, user input tools, such as keyboard 16 and mouse 18 and a display, such as a CRT display 20. CPU 12 and Memory 14 are shown in block diagram form in FIG. 1 for illustration purposes only.

According to a primary aspect of the present invention, a library of shadow scene icons is stored in memory 14, each shadow scene represented by a corresponding icon 21 on the CRT 20 (FIG. 2). A user selects an icon 21 from the CRT 20, thereby initiating a semi-automatic tool operative on a pre-defined object to produce a preliminary shadow area to the object in the image. The preliminary shadow area may later be modified manually by the user.

Each of the shadow scenes stored in memory 14 represented by the icons 21 in the library, encapsulate therein several specific shadow qualities. A non limiting example of these qualities may include the length of the shadow, its relative size, its direction and other geometrical properties. Yet the shadow scene is general and not related to any specific object.

The use of the shadow scene icons 21 automates the shadow area definition and provides a repeatable method for reproducing the same shadow on many different objects, while preserving the general appearance of the shadows.

Figure 3:
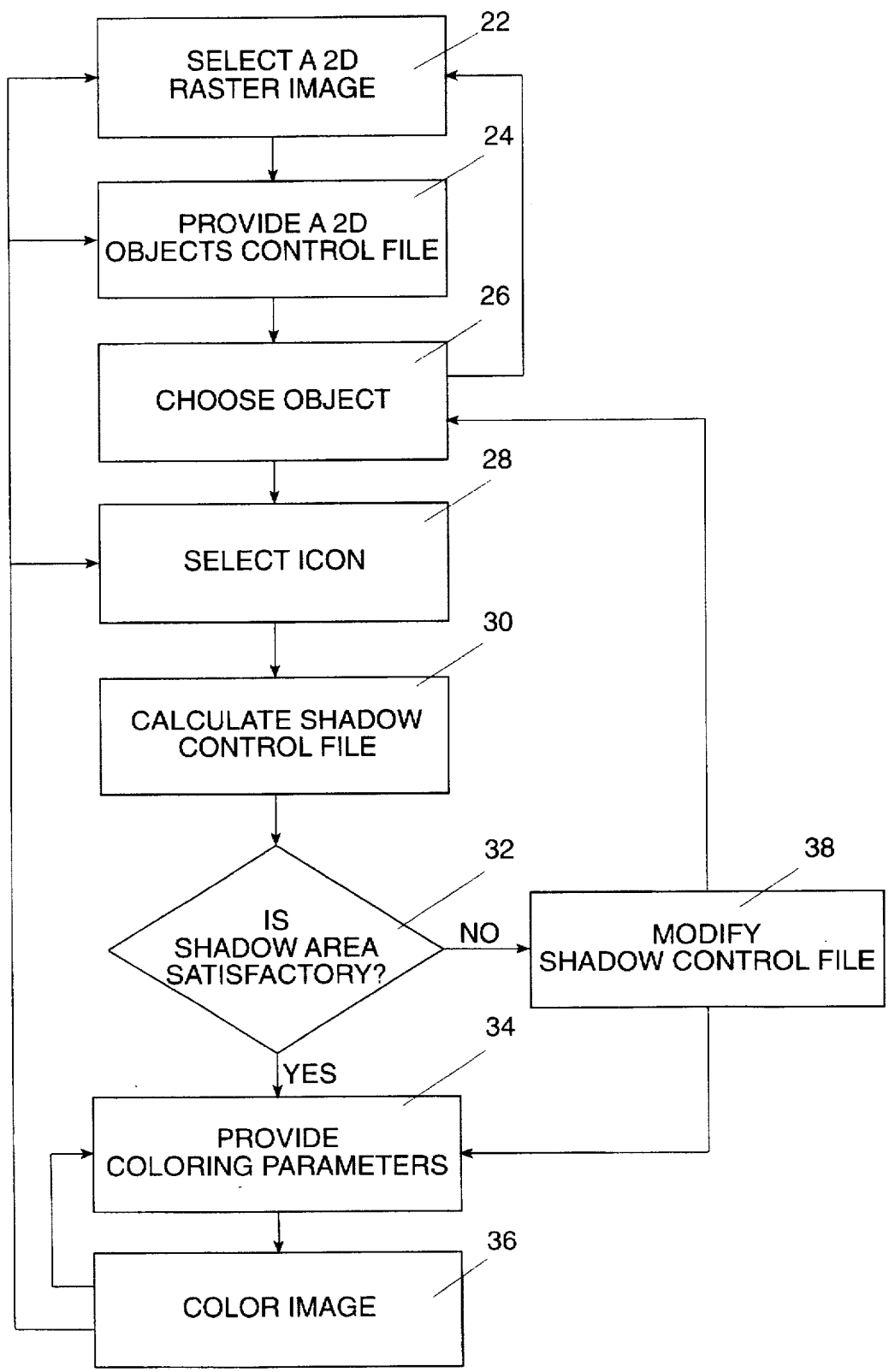
FIG. 3 is a schematic flow chart illustration of a preferred method of the present invention for generating artificial shadow in a 2D color image.

Prior to operating the shadow scene library, as best seen in FIG. 3, the user selects a 2D image to be edited as shown in 22. In the preferred embodiment, the 2D image is a raster image. The selected image provided in 22 has been provided to workstation 10 by any suitable way, a non limiting example being an image provided by scanning an original color image employing a scanner 2 (FIG. 1).

Next, as indicated by 24, the user provides an object control file which defines for each pixel in the image provided in 22 whether it forms part of an object or part of the background.

In step 26, the user chooses an object to be shadowed and in 28 the user selects an icon which represents a shadow scene to be applied to the selected object. Preferably, the user invokes a shadow icon 21 from a collection of pre-defined shadow scene library stored in memory 14. The selected icon activates the shadow scene parametric file on the chosen object. The shadow icon holds the shape of the shadow visually so the user can predict the effect of the icon on its object.

The user chooses the object by any suitable way employing one of the interactive tools. Non limiting examples include the indication of a rectangle of pixels in which the objects reside (object rectangle), or by indicating a pixel that is part of the selected object, from which point the entire rectangle which defines the object is thereby defined.

It will be appreciated that the term object rectangle refers herein to any geometrical feature defining the object and a rectangle is used as a non limiting example thereof.

In step 30, a shadow control file is calculated based on the inputs of step 26 and step 28, as described in detail with reference to FIGS. 4-5 hereinbelow, whereby an artificial shadow is generated and displayed on display 20.

In step 32, the user addresses the question of whether the location of the artificial shadow generated automatically with respect to the selected object satisfies in terms of quality. If assessed positively the process continues by an interactive step in which the user provides coloring parameters to the system at 34 and the generated shadow is colored in 36. If the answer in step 32 is negative an intermediate user interactive step is initiated in which the user changes the location of the generated shadow with respect to the object before the coloring steps 34 and 36.

The user may now select another object at 26 and may apply the same selected shadow scene at 28 so as to create automatically substantially similar artificial shadows for a plurality of objects in the 2D color image.

Figure 4:
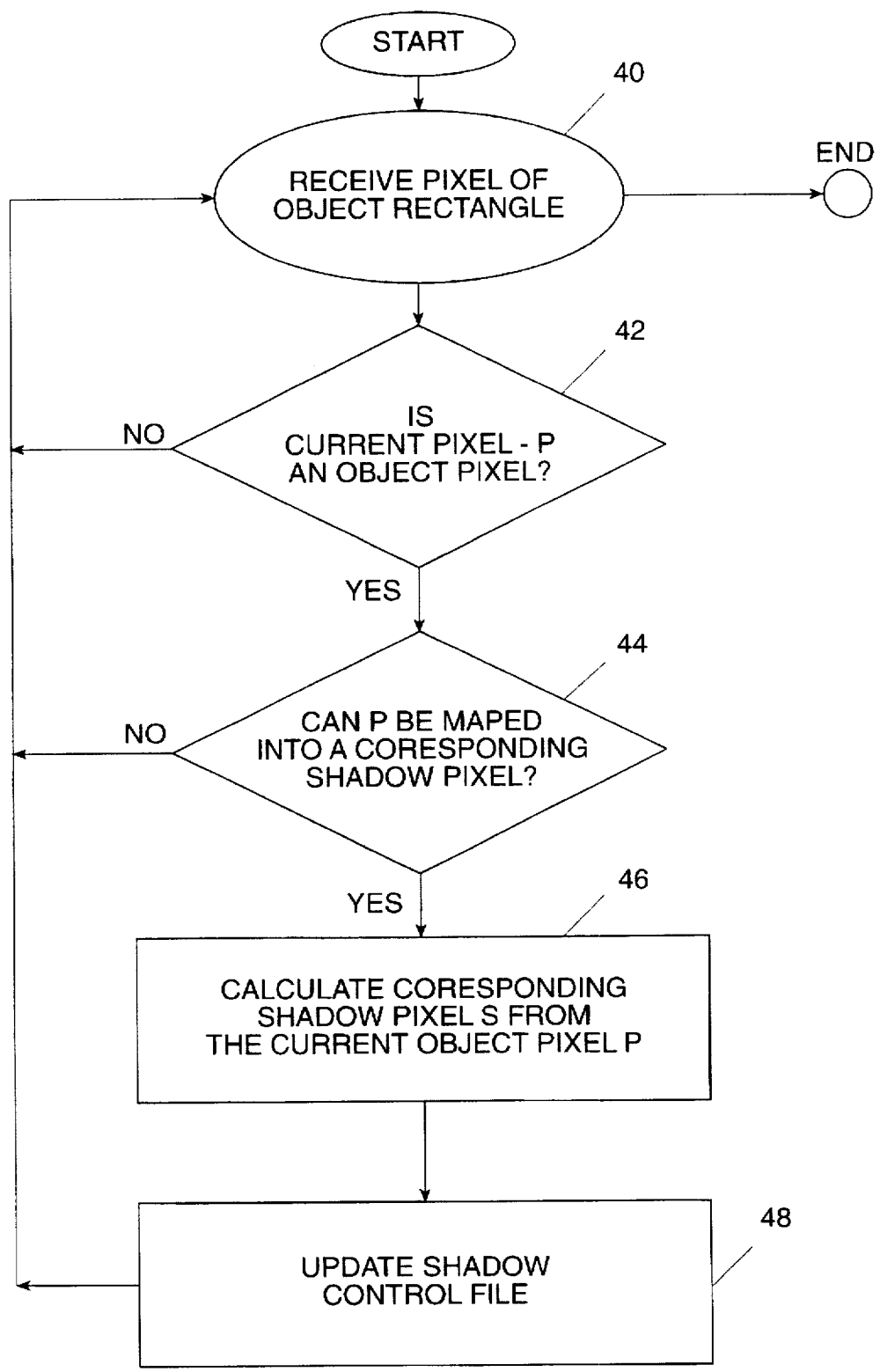
FIG. 4 is a schematic flow chart illustration of the shadow control file generation step of the method of FIG. 3.

Reference is now made to FIG. 4 which illustrates step 30 (FIG. 3) of calculating the shadow control file.

The shadow control file receives as input the pixel values of the object rectangle and the characteristics of the shadow scene and outputs an artificial shadow to the selected object in accordance therewith.

As shown in FIG. 4, the process starts in step 40 in which a pixel of the object rectangle is loaded. In step 42, it is verified that the loaded pixel is an object pixel. This step is necessary since as described hereinabove, a geometrical area defining the object is selected in which not all pixels are actual object pixels.

If the pixel is not an object pixel, the process starts again from 40 by loading the next pixel of the object rectangle. If the pixel is an object pixel, the process continues at 44 in which a check is performed as to whether the pixel P has a corresponding value in the artificial shadow control file S as described in detail hereinbelow. If P does not have a corresponding value the process begins again at 40. If P has a solution, then the corresponding value and location of S is calculated (step 46) and the values of the shadow control file are updated (step 48) with that value for the location of S. The process continues until all object pixels are mapped into corresponding pixels in a corresponding shadow rectangle and the shadow control file is accordingly updated. Finally, the process terminates at step 50.

Figure 5:
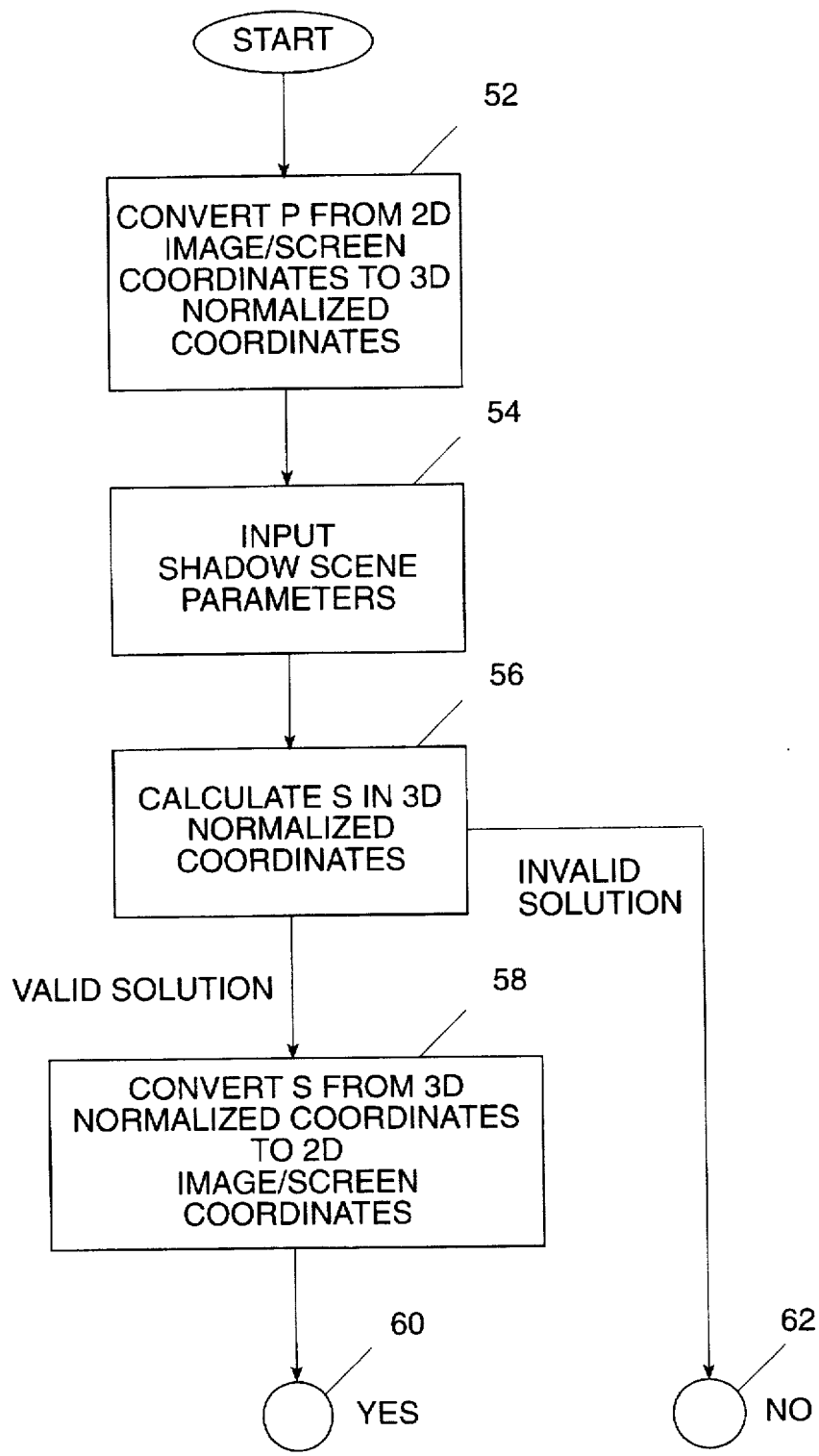
FIG. 5 is a schematic flow chart illustration of the calculation step of FIG. 4.

Reference is now made to FIG. 5 which illustrates the calculation of each location and value of S from corresponding location and value of P so as to generate a shadow rectangle from the object rectangle. It will be appreciated that each of the object rectangle and the shadow rectangle in the 2D plane are defined by two values, the topleft x and y values and the bottomright x and y values, denoted TofLeft (x), TopLeft(y), BottomRight(x) and BottomRight(y), respectively.

In 52, P is converted from its 2D coordinates to a three dimensional (3D) normalized coordinates, i.e. for each value of P (Px,Py) a normalized value Pn (Nx,Ny, 0) is calculated. In the preferred embodiment, X and Y are measured from the topleft point of the image raster file. An exemplary calculation for the 2D to 3D conversion is described by equation 1 as follows:

$$Nx=[Px-\text{TopLeft}(x)]/[\text{Max}(\text{Height},\text{Width})]-\text{NewDX}/2 \quad Ny=[\text{BottomRight}(y)-Py]/\text{Max}(\text{Height},\text{Width}) \quad (1)$$

wherein TopLeft(x) and BottomRight(y) are the x value of the top left point and the y value of the bottom right point of the object rectangle. Height is the number of pixels in each line in the object rectangle. Width is the number of lines in the object rectangle and NewDX is calculated as follows:

$$\text{NewDX}=\text{Width}/\text{Max}(\text{Height},\text{Width}) \quad (2)$$

wherein Max(Height,Width) is the maximum between Height and Width of the rectangle.

The normalized values of P (Nx,Ny,0) are further modified in accordance with the shadow scene parameters entered in 54. The shadow scene parameters include at least a representation of a shadow plane and a location of a light source. In one exemplary shadow scene, an indication of the artificial shadow angle with respect to the horizon, the height of the object above a reference level, such as the ground level and the location of the light source for which the shadow is generated may be provided.

At step 56, the conversion P (Nx,Ny,0) to S (Nx,Ny,Nz) is made wherein a Z value denoted Nz is derived from the transformation from the object rectangle plane to the artificial shadow plane.

A preferred method for converting P to S is by projecting each light ray produced by the light source defined as part of the characterization of the shadow scene into the plane defined by the shadow rectangle as is well known in the art.

An exemplary calculation may be based on a parameter representing the time travelled by an artificial light ray from a light source defined as part of the characterization of the shadow scene through the object rectangle onto the shadow rectangle.

In a preferred calculation based on a time related parameter, a light ray which travels through the object plane is denoted three time values, 0 at the light source, 1 at the object plain and more than 1 in the shadow rectangle plane.

Provided the light source coordinates L(Lx,Ly,Lz) and the point the coordinates of the point of intersection through the object plane P(Nx,Ny,0), the light ray can be calculated as follows:

$$\text{LightRay}(t)=L(Lx,Ly,Lz)+[P(Nx,Ny,0)-L(Lx,Ly,Lz)]*t \quad (3a)$$

Then, solving a three free parameters equation set for the parameter t $$\text{LightRay}(t)=\text{Shadow plane }(k,l) \quad (3b)$$

wherein Shadow plane (k,l) are the coordinates of projection on the plane coinciding with the shadow rectangle, the coordinates for S can be solved from $$S(Nx,Ny,Nz)=\text{LightRay}(t') \quad (3c)$$

wherein t' is the solution for the free parameter t.

If the parameter t' is smaller or equal to 1, a projection point on S is not found and the process terminates at 62 (FIG. 5). If t' is larger then 1 than the process continues at 58 as described hereinbelow.

At step 58, the shadow point S (Nx,Ny,Nz) is converted back into 2D image screen coordinate system as follows:

$$\text{ShadowX}=(Sx+\text{NewDX}/2)\ \text{MAX}(\text{Height},\text{Width})+\text{TopLeft}(x) \quad (4a)$$

$$\text{ShadowY}=\text{BottomRight}(y)-Sy\ \text{MAX}(\text{Height},\text{Width}) \quad (4b)$$

$$\text{ShadowZ}=Sz\ \text{MAX}(\text{Height},\text{Width}) \quad (4c)$$

wherein the parameters are the corresponding parameter in the shadow rectangle to those in the object rectangle. The point (Shadow X, Shadow Y, Shadow Z) is written now in the shadow control file. In the preferred embodiment, all pixels in the shadow control file are set at initiation to infinity, and for each solution (Shadow X, Shadow Y, Shadow Z), Sz is written in location Sx, Sy, thus adding a shadow pixel to the shadow control file.

Finally, the point (ShadowX, ShadowY) updates the shadow rectangle (step 48 of FIG. 4) as follows:

if (ShadowX<TopLeft(x)) then TopLeft(x)=ShadowX (5a)

if (ShadowX>BottomRight(x)) then BottomRight(x)=ShadowX (5b)

if (ShadowY<TopLeft(y)) then TopLeft(y)=ShadowY (5c)

if (ShadowY>BottomRight(y)) then BottomRight(y)=ShadowY (5d)

As shown best in FIG. 3, once the generation of the artificial shadow is completed as described hereinabove, the user may color the pixels within the shadow rectangle i.e., the pixels with Sz value which is not infinity, in any desired color employing any user interactive tool and/or application known in the art. Non limiting examples of such tools are the vignette or degrade tools commercially available with the above mentioned Prisma workstation.

An example of the user input in the coloring step 36 includes a user input of the darkest color in the artificial shadow, the brightest color in the artificial shadow and a shadow curve for defining the change in color between the darkest and brightest points. Further, the coloring step 36 may take into account the Sz values of the pixels within the shadow rectangle so as to assign a color in accordance with the distance from the object.

According to a preferred embodiment of the present invention, pixels within the shadow rectangle which overlap with pixels of the object are not colored as these pixels do not appear in the final image with the artificial shadow since they are being hidden by the object and therefore retain the color of the object.

While the invention has been described with respect to a limited number of embodiments, it will be appreciated that many variations, modifications and other applications of the invention, all of which fall within the scope of the present invention exist. For example, the user may generate the same artificial shading for a plurality of objects in the 2D image as described above but with different shadow colors or color curves.

It will be appreciated by persons skilled in the art that the present invention is not limited to what has been particularly shown and described hereinabove. Rather, the scope of the present invention is defined only by the claims that follow:

I claim:

1. A method for generating an artificial shadow in a two dimensional color image comprising:

providing a shadow scenes library, each shadow scene representing at least one artificial shadow orientation with respect to an object forming said shadow;

receiving a user input, said user selecting one of said shadow scenes and an object in said two dimensional image to be shadowed;

forming an artificial shadow to said object to be shadowed in accordance with said selected shadow scene;

wherein forming said artificial shadow includes:

calculating said artificial shadow from said object and an object scene; and moving said calculated artificial shadow to a selected location with respect to said object; and wherein calculating said artifical shawdow includes;
   converting said geometrical feature defining said object from a two dimensional representation to a three dimensional representation;
   providing parameters defining said selected shadow scene;
   determining a three dimensional representation of said artificial shadow defined by a corresponding geometrical feature based on said parameters and said three dimensional representation of said object obtained by said converting; and
   converting the three dimensional representation of said geometrical feature defining said artificial shadow to two dimensional representation thereof, thereby providing said artificial shadow.

2. The method of claim 1 further comprising selecting at least one additional object in said two dimensional color image and forming a shadow to each said selected objects in accordance with said selected shadow scene.

3. The method of claim 1 further comprising defining a geometrical feature defining said object.

4. The method of claim 3 wherein said geometrical feature is rectangular.

5. The method of claim 3 wherein said forming comprises:
   calculating said artificial shadow from said geometrical feature defining said object and said selected object scene; and
   applying at least one color to said artificial shadow.

6. The method of claim 1 wherein said forming also comprises the step of applying at least one color to said artificial shadow.

7. The method of claim 1 wherein said parameters include selected ones from the group consisting of an indication of the artificial shadow angle with respect to the horizon, the height of the object above a reference level, such as the ground level, a location of the light source and any combination therebetween.

8. The method of claim 1 wherein said shadow scene library is represented by a graphic representation displayable to said user.

9. Apparatus for generating an artificial shadow in a two dimensional color image comprising:
   means for providing a shadow scenes library, each shadow scene representing at least one artificial shadow orientation with respect to an object forming said shadow;
   means for receiving a user input, said user selecting one of said shadow scenes and an object in said two dimensional image to be shadowed;
   means for forming an artificial shadow to said object to be shadowed in accordance with said selected shadow scene;
   wherein means for forming said artifical shadow includes;
      means for calculating said artificial shadow from said object and an object scene; and
      means for moving said calculated artificial shadow to a selected location with respect to said object; and
   wherein said means for calculating said artificial shadow includes;
      means for converting said geometrical feature defining said object from a two dimensional representation to a three dimensional representation;
      means for providing parameters defining said selected shadow scene;
      means for determining a three dimensional representation of said artificial shadow defined by a corresponding geometrical feature based on said parameters and said three dimensional representation of said object obtained by said converting; and
      means for converting the three dimensional representation of said geometrical feature defining said artificial shadow to two dimensional representation thereof, thereby providing said artificial shadow.

10. The apparatus of claim 9 further comprising means for selecting at least one additional object in said two dimensional color image and forming a shadow to each said selected objects in accordance with said selected shadow scene.

11. The apparatus of claim 9 further comprising means for defining a geometrical feature defining said object.

12. The apparatus of claim 11 wherein said geometrical feature is rectangular.

13. The apparatus of claim 11 wherein said means for forming comprises:
   means for calculating said artificial shadow from said geometrical feature defining said object and said selected object scene; and
   means for applying at least one color to said artificial shadow.

14. The apparatus of claim 9 wherein said means for forming also comprises means for applying at least one color to said artificial shadow.

15. The apparatus of claim 9 wherein said parameters include selected ones from the group consisting of an indication of the artificial shadow angle with respect to the horizon, the height of the object above a reference level, such as the ground level, a location of the light source and a combination therebetween.

16. The apparatus of claim 9 wherein said shadow scene library is represented by a graphic representation displayable to said user.

* * * * *